United States Patent [19]

Matsumoto

[11] 4,272,715
[45] Jun. 9, 1981

[54] SYSTEM FOR CONTROLLING TORQUE OF INDUCTION MOTORS

[75] Inventor: Mitsuo Matsumoto, Kokubunji, Japan

[73] Assignee: Toshiba Kikai Kabushiki Kaisha, Tokyo, Japan

[21] Appl. No.: 1,014

[22] Filed: Jan. 4, 1979

[30] Foreign Application Priority Data

Jan. 18, 1978 [JP] Japan .................................... 53-3834

[51] Int. Cl.³ .......................... H02P 5/34; H02P 7/42; H02P 5/28; H02P 7/36
[52] U.S. Cl. .................................. 318/800; 318/799; 318/807
[58] Field of Search ............................... 318/798–803, 318/805, 807, 810–812

[56] References Cited

U.S. PATENT DOCUMENTS

| | | | |
|---|---|---|---|
| 3,700,986 | 10/1972 | Cushman et al. | 318/800 |
| 3,851,234 | 11/1974 | Hoffman et al. | 318/800 |
| 3,859,579 | 1/1975 | Plunkett | 318/805 |
| 4,001,660 | 1/1977 | Lipo | 318/802 |
| 4,047,083 | 9/1977 | Plunkett | 318/807 |
| 4,088,935 | 5/1978 | D'Atre et al. | 318/802 |
| 4,137,489 | 1/1979 | Lipo | 318/798 |

Primary Examiner—J. V. Truhe
Assistant Examiner—John B. Conklin
Attorney, Agent, or Firm—Koda and Androlia

[57] ABSTRACT

For the purpose of controlling the torque of a three phase induction motor a control system suitable to be operated by a computer is provided. A torque instruction, an angle of rotation, a flux angle, the magnitude of rotating magnetic field and suitable constants are used to produce current instructions for respective phases to pass stator current necessary to produce an instructed torque.

2 Claims, 7 Drawing Figures

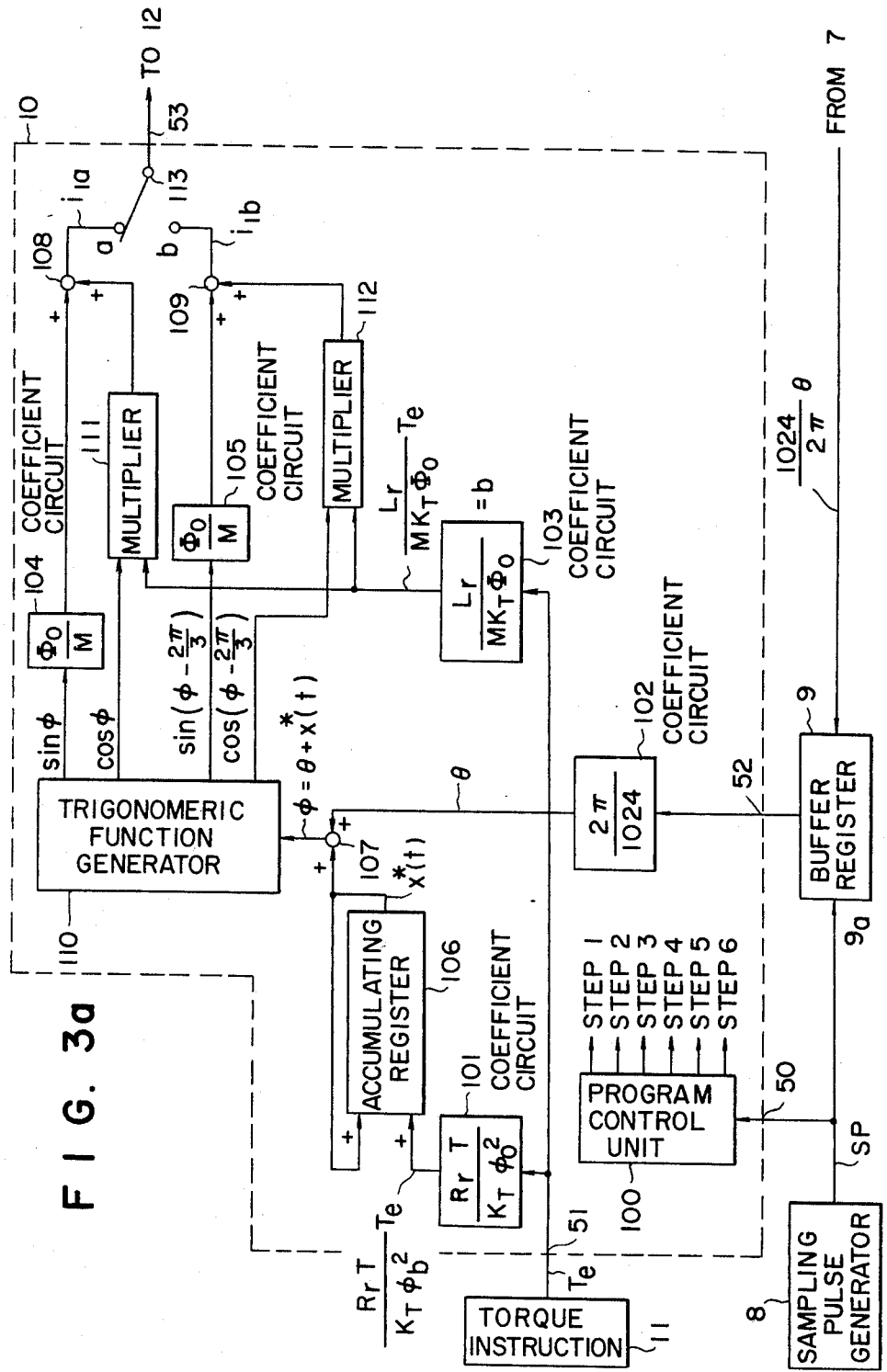
F I G. 3a

SYSTEM FOR CONTROLLING TORQUE OF INDUCTION MOTORS

BACKGROUND OF THE INVENTION

This invention relates to a system for controlling the torque of a polyphase induction motor.

In a position control system and a speed control system where quick response is necessary, shunt DC motors have generally been used. Because the output torque of the shunt motor is theoretically proportional to the armature current so that the control system can be constructed according to a theory of linear automatic control and it is possible to obtain a control system having a quick response characteristic contemplated by the designer.

If it is possible to use an induction motor in such control system as a constant speed motor, there are the following advantages over a DC motor.

More particularly, as there is no commutator, it is easy to maintain and the motor is rugged and free from spark and electric noise. Moreover, as there is no problem of commutation, it is possible to operate the motor at a high current and a high speed. Furthermore, induction motors have excellent dust proofness and explosion proofness and can be manufactured to have a small size at low cost.

Among prior art control systems of an induction motor may be mentioned a so-called V/f constant control system in which the voltage V and the primary frequency f are controlled to be proportional to the speed of the motor. According to this system it is impossible to directly determine the voltage V and the frequency f that can produce a torque having a value instructed by the control system whereby it has been impossible to generate the torque according to the theory of linear automatic control.

SUMMARY OF THE INVENTION

Accordingly, it is an object of this invention to provide an improved control system capable of producing a torque perfectly coinciding with a torque instruction at any time, thus providing a torque control system of an induction motor according to the theory of a linear automatic control.

According to this invention there is provided a system for controlling the torque of a 3 phase induction motor comprising means for detecting an angle of rotation $\theta$ as a digital quantity, means for generating a sampling pulse at a definite period, means for generating a torque instruction $T_e$, digital data processing means for sequentially accumulating a product of said torque instruction and a first constant, a first adder for producing a magnetic flux angle $\phi$ from the accumulating means output and the angle of rotation, means for producing a first phase current instruction ($i_{1a}$) from a first direction component ($\Phi_o/M \cdot \sin\phi$) of a first vector and a first phase direction component ($T_e \cdot L_r/MK_T\Phi_o \cdot \cos\phi$) of a second vector, and a second adder for producing a second phase current instruction ($i_{1b}$) from a second phase direction component ($\Phi_o/M \cdot \sin(\phi - \frac{2}{3}\pi)$) of said first vector and a second phase direction component ($T_e \cdot L_r/MK_T\Phi_o) \cdot \cos(\phi - \frac{2}{3}\pi)$) of said second vector (where $\Phi_o$ is the magnitude of the rotating magnetic field, M is the mutual inductance between stator and rotor windings of the motor, $K_T$ is a constant, and $L_r$ is the self inductance of the rotor windings), a digital-analogue converter for converting said current instructions into analogue current instructions $i_{1a}^*$ and $i_{1b}^*$, a first feedback power amplifier for applying the difference between an output voltage $V_a$ to the first phase stator winding based on said first phase current instruction and a voltage $I_a^*$ corresponding to a current flowing through the first phase stator winding of said motor, a second feedback power amplifier for applying an output voltage $V_b$ to the second phase stator winding based on the difference between said second phase current instruction and a voltage $I_b^*$ corresponding to a current flowing through the second phase stator winding of said motor, and a third power amplifier for producing an output voltage $V_c$ which is equal to $-(V_a + V_b)$ and applied to a third phase stator winding of said motor.

BRIEF DESCRIPTION OF THE DRAWINGS

In the accompanying drawings:

FIGS. 3a and 3b, when combined, constitute a block diagram showing one embodiment of the torque control system of an induction motor according to this invention;

DESCRIPTION OF THE PREFERRED EMBODIMENTS

The principle of the torque control system of an induction motor according to this invention will firstly be described.

Figure 1:
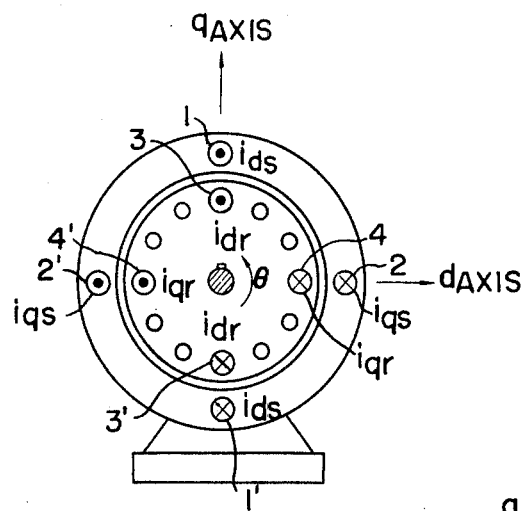
FIG. 1 is a diagrammatic sectional view of a 2 phase induction motor useful to explain the principle of this invention.

To simplify the description, the principle will be described in connection with a 2 phase induction motor. FIG. 1 shows a squirrel cage two phase induction motor showing sections 1 and 1' of one stator winding, and sections 2 and 2' of the other stator winding which is orthogonal to the former. The direction interconnecting sections 2 and 2' is designated as a d axis direction, whereas the direction interconnecting sections 1 and 1' as a q axis direction. Let us denote the current flowing through stator winding 1—1' by $i_{ds}$, that flowing through stator winding 2—2' by $i_{qs}$ and the direction of these currents by dots and crosses.

By the magnetic induction of stator currents $i_{ds}$ and $i_{qs}$, current flows through the rotor windings. Assuming that the rotor windings comprise a winding 3—3' along the q axis and another winding 4—4' along the d axis and that the rotor current comprises a current component $i_{dr}$ flowing through the rotor winding 3—3' and a component $i_{qr}$ flowing through the rotor winding 4—4' which are perpendicular with each other.

Figure 2:
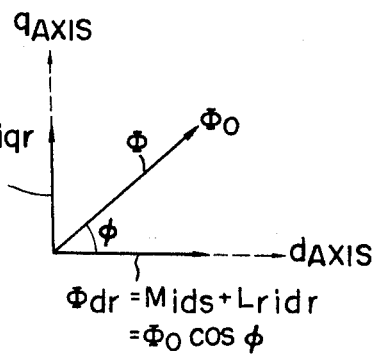
FIG. 2 is a vector diagram showing the fluxes produced in the motor shown in FIG. 1.

The currents $i_{ds}$ and $i_{dr}$ flowing through the windings 1—1' and 3—3' produce a magnetic flux $\Phi_{dr}$ through the rotor in the direction of d axis as shown in FIG. 2. The fluxes $\Phi_{dr}$ and $\Phi_{qr}$ in the q axis created by the currents $i_{qs}$ and $i_{qr}$ flowing through windings 2—2' and 4—4' respectively are given by the following equations:

$$\left.\begin{array}{l}\Phi_{dr} = M \cdot i_{ds} + Lr \cdot i_{dr} \\ \Phi_{qr} = M \cdot i_{qs} + Lr \cdot i_{qr}\end{array}\right\} \quad (1)$$

where
M: the mutual inductance between the stator winding and the rotor winding, and
Lr: the self inductance of the rotor winding.

When the rotor is rotating at an angular velocity $\dot{\theta}$ (rad/sec) in a counterclockwise direction as viewed in FIG. 1, and when the rotor windings 3—3' and 4—4' are short circuited the following equations hold:

$$\left.\begin{array}{l}-\dot{\theta}\Phi_{qr} - \dfrac{d\Phi_{dr}}{dt} = R_r \cdot i_{dr} \\ \dot{\theta}\Phi_{dr} - \dfrac{d\Phi_{qr}}{dt} = R_r \cdot i_{qr}\end{array}\right\} \quad (2)$$

where $R_r$: the resistance of the rotor winding.

Where a rotating magnetic flux $\vec{\Phi}$ having a constant value $\Phi_o$ and an angular velocity $\phi$ links the rotor winding, $\Phi_{dr}$ and $\Phi_{qr}$ are given by the following equation:

$$\left.\begin{array}{l}\Phi_{dr} = \Phi_o \cdot \cos \phi \\ \Phi_{qr} = \Phi_o \cdot \sin \phi\end{array}\right\} \quad (3)$$

From equations (1), (2) and (3), the stator currents $i_{ds}$ and $i_{qs}$ are given by the following equation:

$$\left.\begin{array}{l}i_{ds} = \dfrac{\Phi_o}{M} \cos \phi - \dfrac{Lr}{M \cdot R_r} (\dot{\phi} - \dot{\theta})\Phi_o \cdot \sin \phi \\ i_{qs} = \dfrac{\Phi_o}{M} \sin \phi - \dfrac{Lr}{M \cdot R_r} (\dot{\phi} - \dot{\theta})\Phi_o \cdot \cos \phi\end{array}\right\} \quad (4)$$

where
$\dot{\phi} = d\phi/dt$.

Since equation (3) can be derived from equations (4), (1) and (2), when currents $i_{ds}$ and $i_{qs}$ given by equation (4) are passed through the stator windings, d axis and q axis flux components $\Phi_{dr}$ and $\Phi_{qr}$ having a constant value $\Phi_o$ and given by equation (3) are produced.

On the other hand, the torque $T_e$ to be produced by the induction motor shown in FIG. 1 is expressed by the following equation:

$$T_e = K_T(\Phi_{qr} i_{dr} - \Phi_{dr} i_{qr}) \quad (5)$$

where $K_T$: a constant.

From equations (2), (3) and (5), we obtain $$T_e = \dfrac{K_T \cdot \Phi_o^2}{R_r}(\dot{\phi} - \dot{\theta}) \quad (6)$$

By substituting equation (6) into equation (4) we obtain $$\left.\begin{array}{l}i_{ds} = \dfrac{\Phi_o}{M} \cos \phi - \dfrac{Lr}{MK_T\Phi_o} \cdot T_e \cdot \sin \phi \\ i_{qs} = \dfrac{\Phi_o}{M} \sin \phi - \dfrac{Lr}{MK_T\Phi_o} \cdot T_e \cdot \cos \phi\end{array}\right\} \quad (7)$$

By integrating both sides of equation (6) we obtain $$\phi = \dfrac{R_r}{K_T\Phi_o^2} \int T_e \cdot dt + \theta \quad (8)$$

Where a desired torque instruction $T_e$ for the induction motor is given by the above described calculation, this desired torque instruction $T_e$ is substituted in equations (7) and (8) to obtain stator currents $i_{ds}$ and $i_{qs}$. When these currents are passed through the stator windings the induction motor would produce an output torque commensurate with the instructed value $T_e$.

More particularly, when the desired torque instruction $T_e$ expressed by equations (7) and (8) is varied instantaneously, the motor instantaneously produces an output torque perfectly coinciding therewith. This relationship holds true for any number of revolutions $\theta$ of the motor thus enabling a quick response torque control of an induction motor in the same manner as in a DC motor.

Where the torque instruction $T_e$ given by equations (7) and (8) is negative, the motor would produce a negative torque.

When the principle described above is applied to a three phase induction motor, the currents $i_{1a}$ and $i_{1c}$ flowing through the stator of the motor must satisfy the following relationship:

$$\left.\begin{array}{l}i_{1a} = \dfrac{\Phi_o}{M} \sin \phi + \dfrac{Lr}{MK_T\Phi_o} \cdot T_e \cdot \cos \phi \\ i_{1b} = \dfrac{\Phi_o}{M} \sin (\phi - \frac{2}{3}\pi) + \dfrac{Lr}{MK_T\Phi_o} T_e \cdot \cos(\phi - \frac{2}{3}\pi) \\ i_{1c} = \dfrac{\Phi_o}{M} \sin (\phi - \frac{4}{3}\pi) + \dfrac{Lr}{MK_T\Phi_o} \cdot T_e \cdot \cos(\phi - \frac{4}{3}\pi)\end{array}\right\} \quad (9)$$

Having described the principle of the torque control system of an induction motor of this invention, typical preferred embodiment of the torque control system will now be described with reference to FIGS. 3 to 7.

Figure 3B:
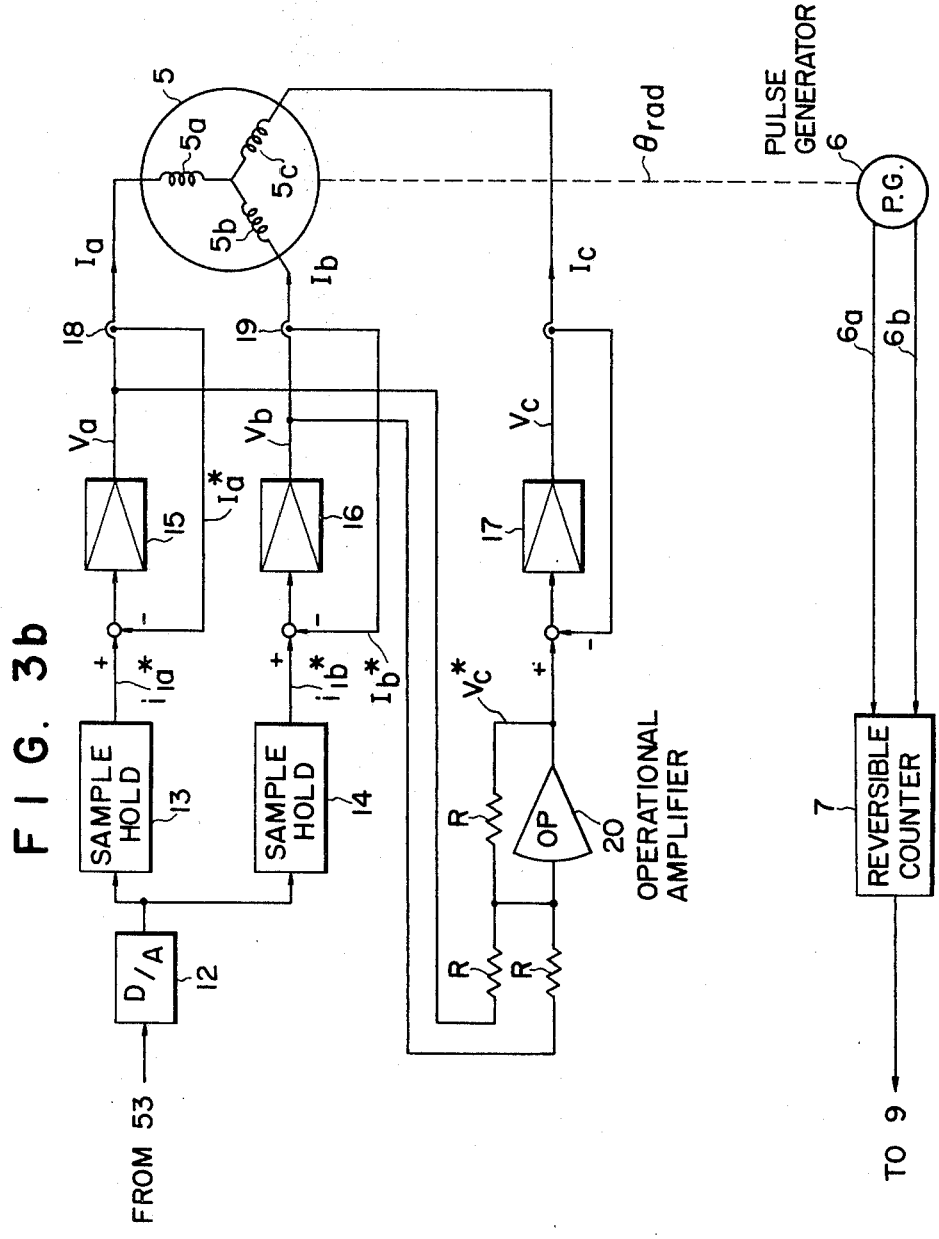

The torque control system shown in FIGS. 3a and 3b comprises a pulse generator 6 connected to the shaft of a two pole 3 phase induction motor 5 to generate an electrical pulse 6a proportional to the speed of the motor. Assume now that the pulse generator 6 generates 1024 pulse signals per one revolution of the motor 5, and that the pulse generator 6 also generates a direction identification signal 6b in response to the forward and reverse rotation of the motor. Signals 6a and 6b are applied to a reversible counter 7 in the form of a binary 10 bit counter which counts up pulses 6a when the motor is rotating in the forward direction but counts down when the direction of rotation is reversed. Denoting the angle of rotation of the motor 5 less than one complete revolution by $\theta$ (radians), the count of the reversible counter 7 which may be any one of 0-2047 is expressed by $1024\theta/\pi$ when $\theta$ is a quantity corresponding to that of $\theta$ in equation (8).

A sampling pulse generator 8 is provided to produce a sampling pulse SP with a sampling period T=1/1000 sec. and this pulse SP is applied to a computer 10 so as to execute a program necessary to calculate stator currents $i_{1a}$, $i_{1b}$ and $i_{1c}$ expressed by equation (9) at each T second. The sampling pulse SP is also applied to the control terminal $9_a$ of a binary 10 bit buffer register 9 for transferring the count of the reversible counter 7 to the buffer register 9 is response to each pulse SP. In this manner, the content of the buffer register 9 is renewed to a quantity $1024\theta/2\pi$ corresponding to the angle of rotation $\theta$ of the motor at each T second.

Elements bounded by dot and dash lines constitute a digital computer 10. These elements are coefficient circuits 101, 102, 103, 104 and 105, an accumulating register 106, adders 107, 108 and 109, a trigonometric function generator 110, multipliers 111 and 112 and a transfer switch 113. Actually, these elements are not provided individually but they are constituted by common hardwares when they are operated on the time division basis under the control of a program control unit 100 in the computer. It should be understood that where the invention is carried out with hardwares various elements are actually constructed as digital circuits and connected as shown in FIG. 3. If desired, a portion or whole of these elements may be constructed as analogue circuits.

The sampling pulse SP is applied to the trigger terminal 50 of an interruption program control unit 100 to cause it to sequentially execute programs of steps 1 through 6.

These steps are executed in less than T=1/1000 sec. so that the program control unit 100 interrupts the operation of the computer or executes another program not related to this invention until next pulse SP is generated.

As a pulse SP is generated and as the program control unit 100 executes the program of step 1, a digital torque instruction $T_e$ generated by a torque instruction generator 11 is applied to coefficient circuit 101 through an input port 51 and multiplied by a predetermined coefficient $R_r T/K_T \Phi_o^2$ to produce a signal $T_e \cdot R_r T/K_T \Phi_o^2$. This signal or data is added to the content $X^*(t-T)$ of the accumulating register 106 at the previous sampling time to produce a content $X^*(t)$ at the present sampling time.

$$X^*(t) + \frac{R_r \cdot T}{K_T \cdot \Phi_o^2} \cdot T_e + X^*(t - T)$$

Thus, the content of the accumulating register 106 is expressed by $$\sum_{t=0}^{t=nT} \frac{R_r T}{K_T \Phi_o^2} \cdot T_e$$

which corresponds to the integral $$\frac{R_r}{K_T \Phi_o^2} \cdot \int T_e dt$$

of the righthand term of equation (8).

When the program control unit 100 executes the program of step 2, the content of the buffer register 9 is supplied to the coefficient circuit 102 through an input port 52 where the content is multiplied with a coefficient $2\pi/1024$ to form a data corresponding to $\theta$ in equation (8).

This $\theta$ and the value $X^*(t)$ obtained by step 1 are added together by the adder 107 to obtain flux angle $\phi$ shown in equation (8).

Then the program of step 3 is executed and the trigonometric function generator 110 calculates $\sin \phi$, $\cos \phi$, $\sin(\phi - \frac{2}{3} \cdot \pi)$ based on the flux angle $\phi$ formed at step 2.

By the program of step 4, a data $$\frac{Lr}{MK_T \Phi_o} \cdot T_e$$

is produced by multiplying signal $T_e$ from the torque instruction generator 101 with a coefficient $$\frac{Lr}{MK_T \Phi_o}$$

by the coefficient circuit 103.

Then the program of step 5 is executed to calculate equation (9).

$$i_{1a} = \frac{\Phi_o}{M} \sin \phi + \frac{Lr}{MK_T \Phi_o} \cdot T_e \cdot \cos \phi$$

by a coefficient circuit 104, multiplier 111 and adder 108.

This signal $i_{1a}$ is applied to a digital-analogue converter 12 through an output port 53 and through transfer switch 113 which is thrown to the upper contact a when the program of step 5 is being executed to be converted into an analogue quantity which is applied to a sample hold circuit 13 to change its output $i_{1a}^*$ to a value corresponding to the value of $i_{1a}$ calculated at this time thereby completing step 5. Thereafter the output $i_{1a}^*$ of the sample hold circuit 13 is held at this value $i_{1a}$ until a new value thereof is calculated by step 5 of the next sampling period.

Then the program of step 6 is executed to calculate the following equation (9)

$$i_{1b} = \frac{\Phi_o}{M} \sin (\phi - \frac{2}{3} \cdot \pi) + \frac{Lr}{MK_T \Phi_o} \cdot T_e \cdot \cos(\phi - \frac{2}{3} \cdot \pi)$$

with coefficient circuit 105, multiplier 112 and adder 109. This $i_{1b}$ signal is applied to the digital analogue converter 12 through transfer switch 113 which is thrown to the lower contact b while the program of step 6 is being executed to be converted into an analogue quantity. Consequently, the output voltage $i_{1b}^*$ of the sample hold circuit 14 is changed to a value corresponding to $i_{1b}$ just calculated, thus completing the program of step 6.

As above described, at each sampling time having a period of T=1/1000 sec. the output of the sample hold circuits are changed to analogue voltages corresponding to the stator currents $i_{1a}$ and $i_{1b}$ of the induction motor which are necessary to produce the instructed torque.

In an application where the response time of the torque control system is sufficiently larger than the sampling period T=1/1000 sec. there is no defect that the response of the torque control is unduly delayed when currents $i_{1a}$ and $i_{1b}$ are calculated once at each sampling time.

The output voltage $i_{1a}^*$ of the sample hold circuit 13 is used as a reference instruction voltage for the current $I_a$ flowing through the stator winding $5_a$ of phase a. Thus a phase current is converted into a voltage $I_a^*$ corresponding to current $I_a$ by a current detector 18. The difference between instructed value $i_{1a}^*$ and fedback quantity of $I_a^*$ is amplified by a power amplifier 15 and its output $V_a$ is applied to the a phase stator winding $5_a$ of the motor.

Since the power amplifier 15 controls its output voltage $V_a$ such that the difference between $i_{1a}^*$ and $I_a^*$ is made to be always zero, $I_a = i_{1a}^*$.

In the same manner, the output voltage $V_b$ of a power amplifier 16 is applied to b phase stator winding $5_b$ of the motor to effect a feedback control such that the difference between the b phase current reference instruction current $i_{1b}^*$ and the output voltage $I_b^*$ of the current detector 19 of the b phase current $I_b$ would always be zero.

As above described the stator currents $I_a$ and $I_b$ of phases a and b are controlled to have values corresponding to the torque instruction $T_e$ of equations (8) and (9).

The output voltage $V_c$ of a power amplifier 17 is applied to the c phase stator winding $5_c$ thus passing c phase current $I_c$. However, the sum of the currents flowing through three stator windings $5_a$, $5_b$ and $5_c$ is zero so that the following equation holds:

$$I_a + I_b + I_c = 0$$

In this manner, so long as the stator currents $I_a$ and $I_b$ are controlled to be equal to the instructed values $i_{1a}^*$ and $I_{1b}^*$ irrespective of the value of $V_c$ current $I_c$ automatically satisfies a relationship $$I_c = -(I_a + I_b).$$

Since, in equation (9)

$$i_{1a} + i_{1b} + i_{1c} = 0$$

this value of $I_c$ is equal to $i_{1c}$ in equation (9).

It is advantageous to control the output voltage $V_c$ of power amplifier 17 so as to always satisfy an equation $$V_a + V_b + V_c = 0.$$

Figure 4:
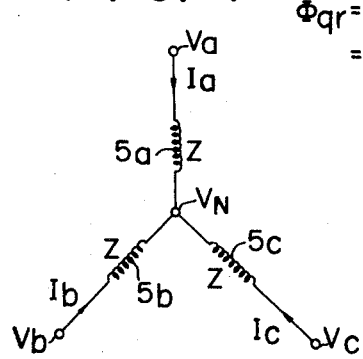
FIG. 4 is a connection diagram of the stator windings of a 3 phase induction motor showing the relationship between the voltages and currents thereof.

The advantage of this control system is as follows. In a case wherein the stator windings $5_a$, $5_b$ and $5_c$ are connected in star as shown in FIG. 4, let us denote the impedance of each winding by Z and assume that the rotor current is zero. Then respective stator currents are given by the following equations where VN represents the voltage of the neutral point $$\left. \begin{array}{l} V_a - VN = ZI_a \\ V_b - VN = ZI_b \\ V_c - VN = ZI_c \end{array} \right\} \quad (10)$$

When a condition under which $V_a + V_b + V_c = 0$ and $I_a + I_b + I_c = 0$ is substituted in equation (10), the neutral voltage $VN = 0$ so that $$I_a = V_a / Z.$$

Thus, current $I_a$ becomes a function of voltage $V_a$ alone and not related to $V_b$ and $V_c$. Consequently, current $I_a$ amplified by the power amplifier 15 can be controlled stably by the current feedback loop without being interferred by voltages $V_b$ and $V_c$.

Where a condition $V_a + V_b + V_c = 0$ does not hold, the control of current $I_a$ becomes unstable due to the interference caused by voltages $V_b$ and $V_c$.

To provide a control of $V_c = -(V_a + V_b)$, voltages $V_a$ and $V_b$ are applied to two addition inputs of an operational amplifier 20 shown in FIG. 3, so that its output voltage $V_c^*$ will be shown by $$V_c^* = -(V_a + V_b).$$

This output voltage $V_c^*$ is compared with the output voltage $V_c$ of the power amplifier 17 and the difference is amplified by the power amplifier 17 which is feedback controlled such that $V_c$ becomes equal to $V_c^*$.

From the foregoing description, it will be understood that the motor can produce at once a torque coincident with the torque instruction under any condition.

Figure 5:
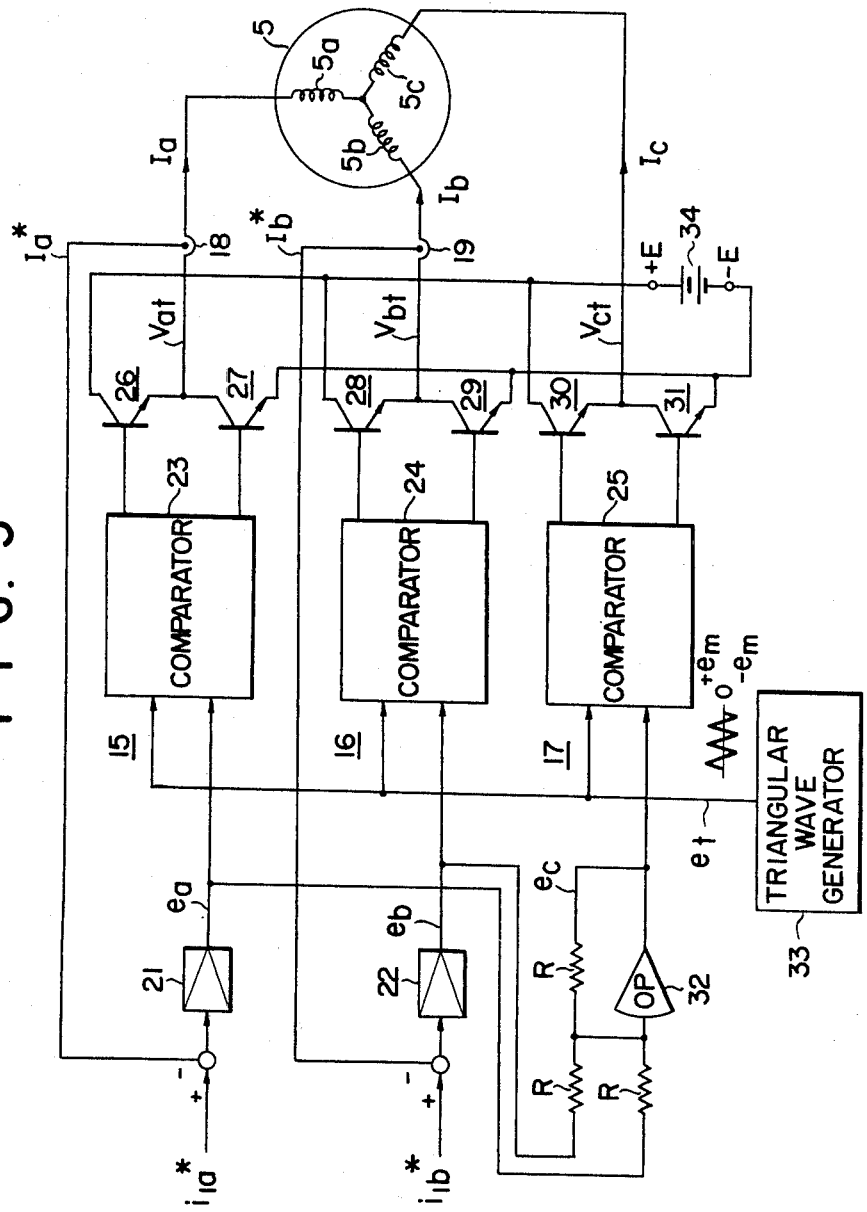
FIG. 5 is a connection diagram showing one example of the power amplifiers 15, 16 and 17 utilized in the control system shown in FIG. 3.

FIG. 5 shows PWM type power amplifiers as one example of the power amplifiers 15, 16 and 17 shown in FIG. 3 which are used to supply stator currents $I_a$, $I_b$ and $I_c$ respectively.

Figure 6:
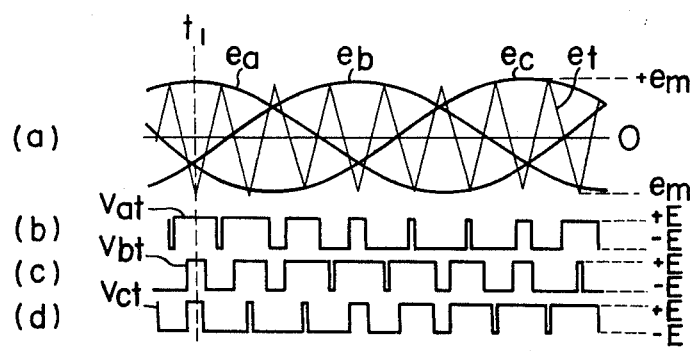
FIG. 6 is a timing chart showing the output voltage waveform of the power amplifiers shown in FIG. 5.

In FIG. 5, the actual stator current $I_a$ is converted into voltage $I_a^*$ by current detector 18, which is fed back to be compared with current reference instruction voltage $i_{1a}^*$. The difference voltage is amplified by power amplifier 21 to produce an output voltage $e_a$ which is compared by a comparator 23 with a triangular voltage $e_t$ produced by a triangular wave generator 33 and having a maximum value $\pm e_m$ as shown in FIG. 6. If $e_a > e_t$, a power transistor 26 is turned ON whereas a power transistor 27 is turned OFF. On the contrary, if $e_a < e_t$, transistor 26 is turned OFF and transistor 27 is turned ON.

In the same manner, a current reference instruction voltage $i_{1b}^*$ is compared with the output voltage $I_b^*$ of current detector 19 which corresponds to the actual stator current $I_b$. The difference between $i_{1b}^*$ and $I_b^*$ is amplified by a power amplifier 22 to produce an output voltage $e_b$ which is compared with the triangular voltage $e_t$. If $e_b > e_t$, power transistor 28 is turned ON and power transistor 29 is turned OFF, whereas when $e_b < e_t$, power transistor 28 is turned OFF and power transistor 29 is turned ON. Voltages $e_a$ and $e_b$ are applied to two addition inputs of an operational amplifier 32 so as to make its output voltage $e_c$ to be equal to $-(e_a + e_b)$. When $e_c > e_t$, the output of comparator 25 turns ON power transistor 30 and turns OFF power transistor 31. Conversely, when $e_c < e_t$, power transistor 30 is turned OFF, while power transistor 31 is turned ON.

The collector electrodes of power transistors 26, 28 and 30 are connected to the positive terminal $+E$ of a DC source 34, while the emitter electrodes of power transistors 27, 29 and 31 are connected to the negative terminal $-E$ of the DC source 34.

The emitter electrode of transistor 26 and the collector electrode of transistor 27 are commonly connected to produce a voltage $V_{at}$ as the output of the power amplifier 15. This output voltage passes stator current $I_a$ to the a phase stator winding $5_a$ via current detector 18.

As above described, the feedback power amplifier 15 constituted by amplifier 21, comparator 23 and power transistors 26 and 27 controls stator current $I_a$ to become equal to the current reference instruction voltage $i_{1a}^*$.

In the same manner, the emitter electrode of transistor 28 and the collector electrode of transistor 29 are commonly connected to produce a voltage $V_{bt}$ as the output of the power amplifier 16 which passes stator current $I_b$ through the b phase stator winding $5_b$ via curent detector 19. Thus, the feedback power amplifier 16 constituted by amplifier 22, comparator 24 and power transistors 28 and 29 controls the stator current $I_b$ to become equal to the current reference instruction voltage $i_{1b}^*$. The emitter electrode of transistor 30 and the collector electrode of transistor 31 are commonly connected to produce a voltage $V_{ct}$ as the output of power amplifier 17 constituted by comparator 25, power transistors 30 and 31 to supply current $I_c$ to the c phase stator winding $5_c$.

Where voltages $e_a$, $e_b$ and $e_c$ are caused to vary as balanced 3 phase voltages as shown in FIG. 6a, the output voltage $V_{at}$ of the power amplifier 15 as shown in FIG. 5 would become a rectangular wave whose pulse width has been modulated with the output of the triangular wave generator 33 which varies between $+E$ and $-E$.

In the same manner, the output voltage $V_{bt}$ and $V_{ct}$ of the power amplifiers 16 and 17 vary as shown in FIGS. 6c and 6d. When these rectangular wave voltages $V_{at}$, $V_{bt}$ and $V_{ct}$ are applied to respective phase windings $5_a$, $5_b$ and $5_c$ of the induction motor 5, by the inductances of the stator and rotor windings of the motor, currents $I_a$, $I_b$ and $I_c$ are smoothed thus eliminating the higher harmonic components of the output of the triangular wave generator 33.

Thus, the stator currents $I_a$, $I_b$ and $I_c$ are equivalent to those produced by mean voltages $V_a$, $V_b$ and $V_c$ of rectangular voltages $V_{at}$, $V_{bt}$ and $V_{ct}$ which have been subjected to pulse width modulation and from which the higher harmonic components of the output of the triangular wave generator 33 have been eliminated. As can be noted from FIGS. 6a–6d, the mean values $V_a$, $V_b$ and $V_c$ of the rectangular voltages $V_{at}$, $V_{bt}$ and $V_{ct}$ are $E/e_m$ times of voltages $e_a$, $e_b$ and $e_c$ respectively. Since the operational amplifier 32 controls the voltage $e_c$ so as to satisfy a relationship $e_a+e_b+e_c=0$, a relationship $V_a+V_b+V_c=0$ can be satisfied.

As shown in FIGS. 6a–6d, which show the outputs $V_{at}$, $V_{bt}$ and $V_{ct}$ of the power amplifiers at a time $t_1$, voltage $e_a$ has a maximum positive value $(+e_m)$ whereas the mean value $V_a$ of the voltage $V_{at}$ also has a maximum positive value $+E$. Suppose now that, at time $t_1$ voltage $e_a$ has increased beyond $+e_m$, with the construction shown in FIG. 5, since the power amplifier 15 cannot produce a mean voltage $V_a$ higher than $+E$, this circuit cannot control a voltage $e_a$ higher than $+e_m$.

With regard to other phases, however, at time $t_1$, since $e_b=e_c=-\frac{1}{2}e_m$, their mean values $V_b$ and $V_c$ are only $-\frac{1}{2}E$. In other words, at time $t_1$, power amplifiers 16 and 17 can produce outputs larger than the negative maximum value $-E$. Thus, among three power amplifiers 15, 16 and 17, the latter two are operating below their full capacities. This is caused by the fact that the circuit shown in FIG. 5 is constructed to control the voltage $V_c$ so as to satisfy the relationship $$V_a+V_b+V_c=0.$$

Figure 7:
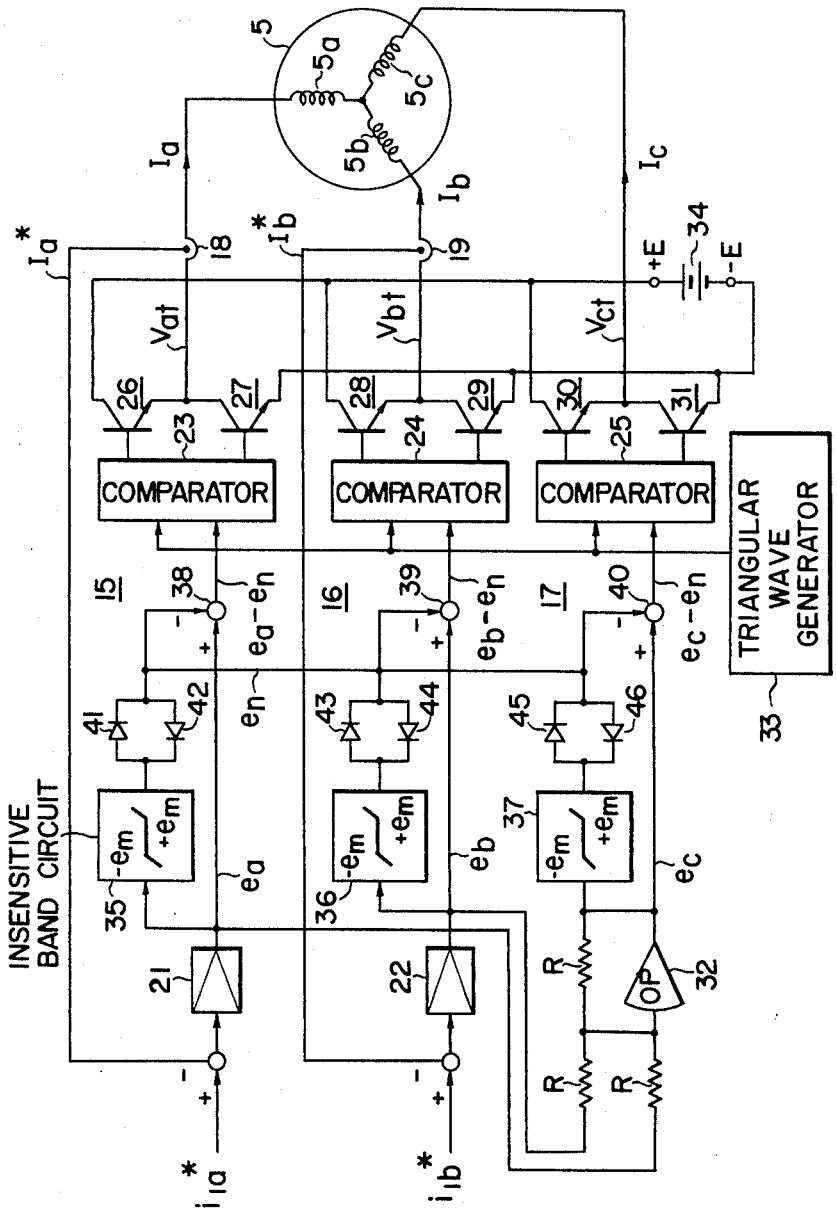
FIG. 7 is a block diagram showing another example of the power amplifiers 15, 16 and 17 shown in FIG. 3.

FIG. 7 shows modified power amplifiers capable of controlling voltage $e_a$ higher than $e_m$ thus enabling to use full output capacity of the power amplifiers. The circuit shown in FIG. 7 is similar to that shown in FIG. 5 except that a circuit including insensitive band circuits 35, 36 and 37 and diodes 41, 42, 43, 44, 45 and 46 for forming voltage $e_n$ from voltages $e_a$, $e_b$ and $e_c$, and subtractors 38, 39 and 40 are added, said subtractors subtracting voltage $e_n$ from voltages $e_a$, $e_b$ and $e_c$ respectively to form voltages $e_a-e_n$, $e_b-e_n$ and $e_c-e_n$.

As operational amplifier 32 shown in FIG. 7 controls voltage $e_c$ so as to satisfy the relationship $$e_a+e_b+e_c=0$$

The output voltages $e_a-e_n$, $e_b-e_n$ and $e_c-e_n$ of respective subtractors 38, 39 and 40 are applied to comparators 23, 24 and 25 so that the mean values $V_a$, $V_b$ and $V_c$ of the output voltages $V_{at}$, $V_{bt}$ and $V_{ct}$ of the power amplifiers 15, 16 and 17 are expressed by the following equations, wherein it is assumed that $e_a-e_n$, $e_b-e_n$ and $e_c-e_n$ are within a range of $\pm e_m$.

$$V_a=(E/e_m)(e_a-e_n)$$

$$V_b=(E/e_m)(e_b-e_n)$$

$$V_c=(E/e_m)(e_c-e_n)$$

Since the circuit shown in FIG. 7 fulfils the conditions of $$e_a+e_b+e_c=0$$

$$I_a+I_b+I_c=0$$

by substituting these conditions in equation (10) and (11), we obtain $$I_a=\frac{E}{e_m\cdot Z}\cdot e_a$$

$$I_b=\frac{E}{e_m\cdot Z}\cdot e_b$$

Notwithstanding the value of the voltage $e_n$ shown by equation (11), the feedback loop for the power amplifier 15 shown in FIG. 7 that controls current $I_a$ becomes independent of the voltages $e_b$ and $e_c$ thus providing a stable control free from any interference of the voltages $e_b$ and $e_c$. Also the current controlling feedback loop for the current $I_b$ is free from the interference of the voltages $e_a$ and $e_c$ thus performing a stable control.

In the circuit shown in FIG. 7, the voltage $e_n$ of equation (11) is controlled such that the voltages $e_a-e_n$, $e_b-e_n$ and $e_c-e_n$ respectively applied to comparators 23, 24 and 25 are controlled to be included in a small range of $\pm e_m$ (the maximum value of the output voltage of the triangular wave generator 33).

More particularly, the insensitive band circuits 35, 36 and 37 shown in FIG. 7 are connected to receive voltages $e_a$, $e_b$ and $e_c$ respectively and constructed to produce output voltages corresponding to the differences between the input voltages and $\pm e_m$. Diodes 41–46 operate such that when the output of any one of the insensitive band circuits produces an output the diodes convert the output into voltage $e_n$. This voltage $e_n$ is subtracted from voltages $e_a$, $e_b$ and $e_c$ by respective subtractors 38, 39 and 40 to produce $e_a-e_n$, $e_b-e_n$ and $e_c-e_n$. Suppose now that voltages $e_b$ and $e_c$ are within the range of $\pm e_m$ and that voltage $e_a$ becomes larger than $\pm e_m$, the insensitive band circuit 35 would produce a voltage $e_a - e_m$. In response to this output, diode 41 converts this voltage $e_n$ into $e_a - e_m$. Thus, the output of the subtractor 38 is expressed by $$e_a e_n = e_m. \qquad 5$$

This means that even when $e_a$ becomes larger than $\pm e_m$, the voltage $V_a$ would be maintained at a constant value of $\pm E$.

When $e_n$ becomes larger than $e_m$ so that voltage $e_n$ increases, the output voltages $e_b - e_n$ and $e_c - e_n$ of subtractors 39 and 40 vary toward negative. However, unless the outputs $e_b - e_n$ and $e_c - e_n$ reach $-e_m$ it is possible to control currents $I_a$, $I_b$ and $I_c$ without being influenced by the voltage saturation of the power amplifiers.

However, when either one of $e_b - e_n$ and $e_c - e_n$ reaches $-e_m$, either one of the power amplifiers 16 and 17 shown in FIG. 7 saturates.

In the circuit shown in FIG. 7, so long as voltages $e_a$, $e_b$ and $e_c$ are maintained in the range of $\pm e_m$, the voltage $e_n$ is zero just in the same manner as the circuit shown in FIG. 5. However, when either one of $e_a$, $e_b$ and $e_c$ exceeds $+e_m$, the mean values $V_a$, $V_b$ and $V_c$ of the phase voltages which have exceeded $+e_m$ are fixed to the saturated value of $\pm E$, whereas the voltage of another phase not saturated is used to compensate for the voltages of the saturated phases, thus fully utilizing the outputs of the power amplifiers.

With the control system shown in FIG. 5 which satisfies a relationship $V_a + V_b + V_c = 0$ a voltage saturation of the power amplifier 15 occurs at time $t_1$ as shown in FIG. 6 so that the interphase voltage of the motor would exceed 1.5E beyond which saturation occurs. On the other hand, with the circuit shown in FIG. 7, the maximum interphase voltage is 2E so that where power transistors 26–31 having the same breakdown voltage are used for FIGS. 5 and 7, the circuit shown in FIG. 7 can increase the output voltage rating by a ratio of 2:1.5 over the circuit shown in FIG. 5.

What is claimed is:

1. A system of controlling torque of a 3 phase induction motor comprising:

means for detecting an angle of rotation $\theta$ of a shaft of said motor in terms of a digital quantity;

means for generating a sampling pulse at a definite period:

means for generating a torque instruction $T_e$; cumulating means responsive to said sampling pulse for sequentially accumulating a product of said torque instruction and a first constant; a first adder for adding an output of said accumulating means and said angle of rotation $\theta$ to produce a magnetic flux angle $\phi$; means for adding together a first phase direction component ($\Phi_o/M \cdot \sin \phi$) of a first vector having a definite magnitude ($\Phi_o/M$) and a direction in said magnetic flux angle $\phi$, and a first phase direction component ($T_e \cdot L_r / M K_T \Phi_o \cdot \cos \phi$) of a second vector which is orthogonal to said first vector and has a magnitude equal to a product of said torque instruction and a second constant ($L_r/MK_T I_o$) for producing a first phase current instruction ($i_{1a}$); a second adder for adding together a second phase direction component ($\Phi_o/M \cdot \sin (\phi - \frac{2}{3}\pi)$) of said first vector, and a second phase direction component ($T_e \cdot L_r / M K_T \Phi_o) \cdot \cos (\phi - \frac{2}{3}\pi)$) of said second vector to produce a second phase current instruction ($i_{1b}$);

where $\Phi_o$ is the magnitude of the rotating magnetic field,

M is the mutual inductance between stator and rotor windings of the motor, $K_T$ is a constant, and $L_r$ is the self inductance of the rotor windings;

a digital-analogue converter for converting said current instructions $i_{1a}$ and $i_{1b}$ produced by said digital data processing means into analogue current instructions $i_{1a}^*$ and $i_{1b}^*$ respectively;

first power amplifier means for amplifying a difference between said analogue current instruction $i_{1a}^*$ and a voltage $I_a^*$ corresponding to current flowing through a first phase stator winding of said motor to apply an output voltage $V_a$ to said first phase stator winding, said first power amplifier means including means for feeding back its output current to its output;

a second power amplifier means for amplifying a difference between said analogue current instruction $i_{1b}^*$ and a voltage $I_b^*$ corresponding to a current flowing through a second phase stator winding of said motor to apply an output voltage $V_b$ to said second phase stator winding, said second power amplifier means including means for feeding back its output current to its input; and third power amplifier means for producing an output voltage $V_c$ which is equal to $-(V_a + V_b)$ and applied to a third phase stator winding of said motor.

2. The system according to claim 1 wherein said first power amplifier means further comprises means for generating said output voltage $V_a$ in response to a difference between a voltage $e_a$ corresponding to the difference between said analogue current instruction $i_{1a}^*$ and said voltage $I_a^*$ and voltage $e_n$ offset from said voltage $e_a$, said second power amplifier means further comprises means for generating said output voltage $V_b$ in response to a difference between a voltage $e_b$ corresponding to the difference between said analogue current instruction $i_{1b}^*$ and said voltage $I_b^*$ and said offset voltage $e_n$, and said third amplifier means comprises means for producing a voltage $e_c$ which is equal to $-(e_a + e_b)$ and means for producing said output voltage $V_c$ which is proportional to a difference between said voltage $e_c$ and said offset voltage $e_n$ thereby controlling said offset voltage $e_n$ such that each of said output voltages $V_a$, $V_b$ and $V_c$ will not exceed a predetermined maximum output voltage of each power amplifier means.

* * * * *